US011879353B2

(12) United States Patent
Watanabe et al.

(10) Patent No.: US 11,879,353 B2
(45) Date of Patent: Jan. 23, 2024

(54) BLADE SET AND BLISK

(71) Applicant: MITSUBISHI HEAVY INDUSTRIES, LTD., Tokyo (JP)

(72) Inventors: Toshio Watanabe, Tokyo (JP); Yuya Fukuda, Tokyo (JP); Shigeki Senoo, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/049,131

(22) Filed: Oct. 24, 2022

(65) Prior Publication Data

US 2023/0126397 A1 Apr. 27, 2023

(30) Foreign Application Priority Data

Oct. 25, 2021 (JP) ................................ 2021-173970

(51) Int. Cl.
*F01D 5/22* (2006.01)
*F01D 5/14* (2006.01)
*F01D 5/16* (2006.01)

(52) U.S. Cl.
CPC ............... *F01D 5/143* (2013.01); *F01D 5/16* (2013.01); *F01D 5/225* (2013.01); *F05D 2220/323* (2013.01); *F05D 2250/38* (2013.01)

(58) Field of Classification Search
CPC ............. F01D 5/143; F01D 5/16; F01D 5/225
See application file for complete search history.

(56) References Cited

U.S. PATENT DOCUMENTS 8,685,314 B2 * 4/2014 Tuppen .................. B23K 20/10 419/62
10,472,980 B2 * 11/2019 Itzel ........................ F01D 5/225
2004/0126235 A1 7/2004 Barb et al.
2010/0278363 A1 11/2010 Richter

FOREIGN PATENT DOCUMENTS

JP 2002-227606 A 8/2002
JP 4721638 B2 7/2011
JP 5143236 B2 2/2013

* cited by examiner

*Primary Examiner* — Sabbir Hasan
(74) *Attorney, Agent, or Firm* — Osha Bergman Watanabe & Burton LLP

(57) ABSTRACT

A blade set of the present disclosure is exposed to a working fluid, which includes a blade main bodies which are disposed at intervals in a circumferential direction about an axis and each extending in a radial direction with respect to the axis wherein a tip end surface is formed on an outer circumferential side of each blade main body and the tip end surface of the blade main body includes a leading edge side region positioned on an upstream side in a flow direction of the working fluid along the axis and a trailing edge side region positioned on a downstream side in the flow direction, and a shroud which is provided on an outer circumferential side of the blade main bodies and covering either the leading edge side regions or the trailing edge side regions of the blade main bodies.

11 Claims, 9 Drawing Sheets

BLADE SET AND BLISK

BACKGROUND OF THE INVENTION

Field of the Invention

The present disclosure relates to a blade set and a blisk. Priority is claimed on Japanese Patent Application No. 2021-173970 filed on Oct. 25, 2021, the contents of which are incorporated herein by reference.

Description of Related Art

A turbopump turbine provided in an engine system of a space rocket has a wide range of an operating rotation speed and a high rotation speed. In addition to this, weight reduction is required. Conventionally, in order to reduce weight, in addition to making each member thinner, a method such as reducing an axial distance between blade rows that employ a blisk structure in which a blade and a disc are integrally formed without a shroud provided at a blade distal end has also been employed.

On the other hand, when the weight of a turbine is reduced, the resonant stress increases when resonance is caused by an exciting force due to adjacent blade rows, and thereby the blades are likely to break. Also, the disc supporting the blade becomes thinner, and vibration of the blade is likely to be coupled with vibration of the disc, thereby forming complex vibration modes. Further, coupled flutter between the blade and the disc is likely to occur. Therefore, when reducing the weight of the turbine, it is required to perform a completely detuned design in which an excitation vibration frequency and a natural vibration frequency of the blade are separated.

Here, as disclosed in, for example, Japanese Unexamined Patent Application, First Publication No. 2002-227606, in a free-standing blade without a shroud, since the blade is only supported by a disc from an inner circumferential side, vibration is likely to occur at blade ends. Therefore, it is conceivable to intentionally provide an annular shroud on an outer circumferential side of the blade to connect the blade. In this case, the entire region from a leading edge side to a trailing edge side of each blade is generally covered with the shroud.

SUMMARY OF THE INVENTION

However, when the entire region from the leading edge side to the trailing edge side of the blade is covered with a shroud as described above, the weight increases by an amount corresponding to the shroud. Thereby, there is a problem that vibration is likely to occur.

The present disclosure has been made to solve the above-described problem, and an objective thereof is to provide a blade set and a blisk in which vibration is further reduced.

In order to solve the above-described problem, a blade set according to the present disclosure is exposed to a working fluid, the blade set includes blade main bodies which are disposed at intervals in a circumferential direction about an axis and each extending in a radial direction with respect to the axis wherein a tip end surface is formed on an outer circumferential side of each the blade body and the tip end surface of the blade body includes a leading edge side region positioned on an upstream side in a flow direction of the working fluid along the axis and a trailing edge side region positioned on a downstream side in the flow direction, and a shroud which is provided on an outer circumferential side of the blade main bodies and covering either the leading edge side regions or the trailing edge side regions of the blade main bodies.

According to the present disclosure, it is possible to provide a blade set and a blisk in which vibrations can be effectively reduced.

DETAILED DESCRIPTION OF THE INVENTION

First Embodiment (Configuration of Rocket Engine)

Hereinafter, a rocket engine 100 and a blade according to a first embodiment of the present disclosure will be described with reference to FIGS. 1 to 5.

Figure 1:
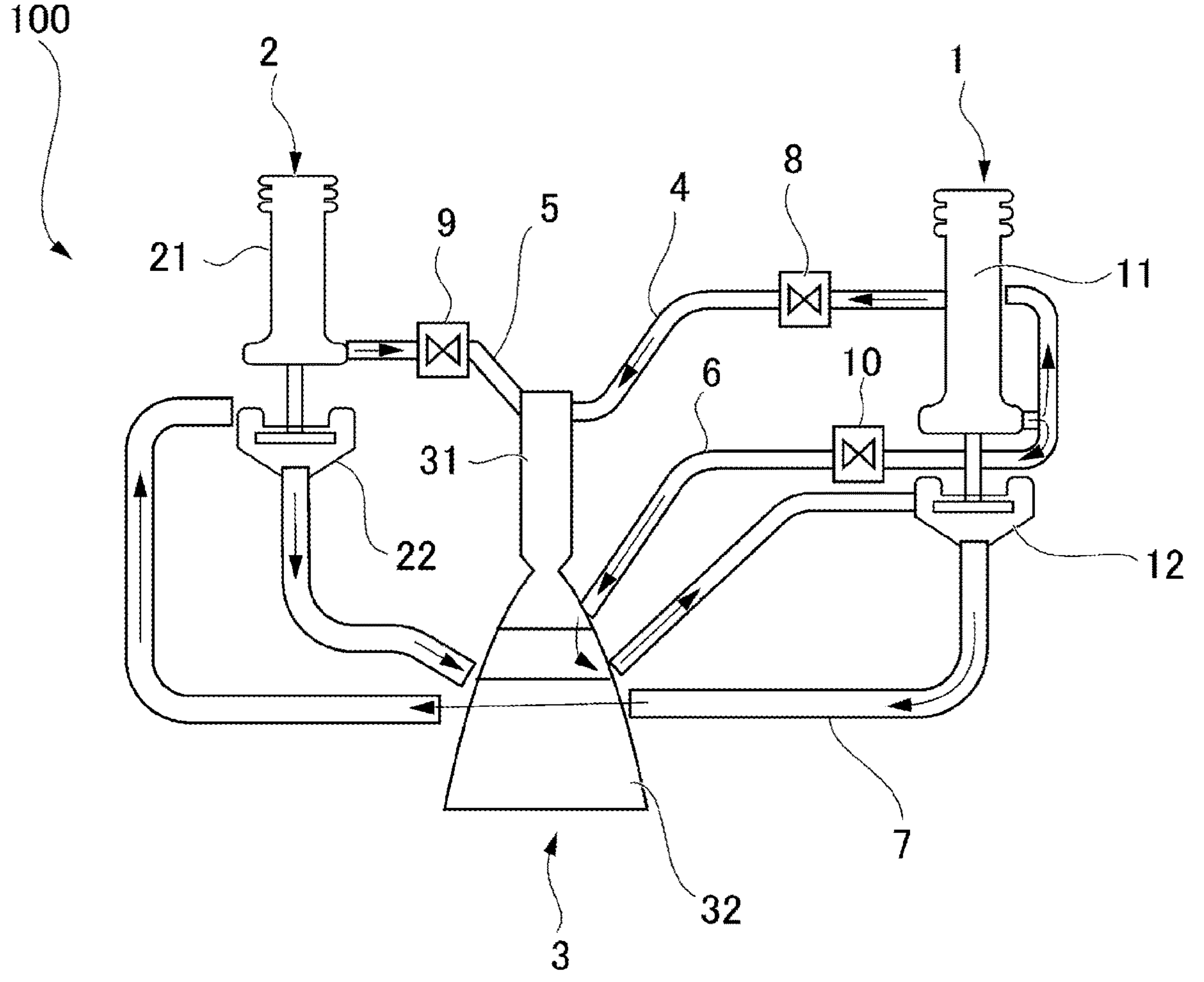
FIG. 1 is a schematic view illustrating a configuration of a rocket engine according to a first embodiment of the present disclosure.

As illustrated in FIG. 1, the rocket engine 100 includes a liquid hydrogen turbopump 1, a liquid oxygen turbopump 2, an engine main body 3, a fuel line 4, an oxidizer line 5, a cooling line 6, a recovery line 7, a fuel valve 8, an oxidizer valve 9, and a coolant valve 10.

The liquid hydrogen turbopump 1 is a device for pressure-feeding liquid hydrogen as fuel to the engine main body 3. The liquid hydrogen turbopump 1 includes a pump main body 11 and a turbine 12. A rotational force generated by the turbine 12 rotationally drives the pump main body 11. The pump main body 11 is connected to the engine main body 3 by the fuel line 4. The fuel valve 8 configured to change a supply amount of liquid hydrogen is provided on the fuel line 4.

Also, the pump main body 11 is also connected to the engine main body 3 by the cooling line 6 that branches from the fuel line 4 on the way. That is, the liquid hydrogen pressure-fed to the pump main body 11 is used not only as fuel but also as a coolant for the engine main body 3. Further, the engine main body 3 includes a combustion chamber 31 and a nozzle 32. Liquid hydrogen as fuel is sent to the combustion chamber 31 through the fuel line 4, and liquid hydrogen as a coolant is sent to the nozzle 32 through the cooling line 6. The coolant valve 10 configured to change a supply amount of liquid hydrogen is provided on the cooling line 6.

The liquid hydrogen as a coolant that has cooled the nozzle 32 through the cooling line 6 is returned to the turbine 12 to apply a rotational energy to the turbine 12. Thereby, the pump main body 11 is driven. The liquid hydrogen that has been used to drive the pump main body 11 is sent to a turbine 22 of the liquid oxygen turbopump 2 to be described later through the recovery line 7 connected to the turbine 12. The liquid hydrogen that has been used to drive the turbine 22 is discharged to the outside of the engine main body 3 through the nozzle 32.

The liquid oxygen turbopump 2 is a device for pressure-feeding liquid oxygen as an oxidizer to the engine main body 3 (combustion chamber 31). The liquid oxygen turbopump 2 includes a pump main body 21 and the turbine 22. A rotational force generated by the turbine 22 rotationally drives the pump main body 21. The pump main body 21 is connected to the combustion chamber 31 of the engine main body 3 by the oxidizer line 5. The oxidizer valve 9 configured to change a supply amount of the oxidizer is provided on the oxidizer line 5.

(Configuration of Turbine)

Next, configurations of the turbine 12 and the turbine 22 described above will be described with reference to FIGS. 2 to 5. Further, since the turbine 12 and the turbine 22 have the same configuration, only the turbine 12 will be described below as a representative.

Figure 2:
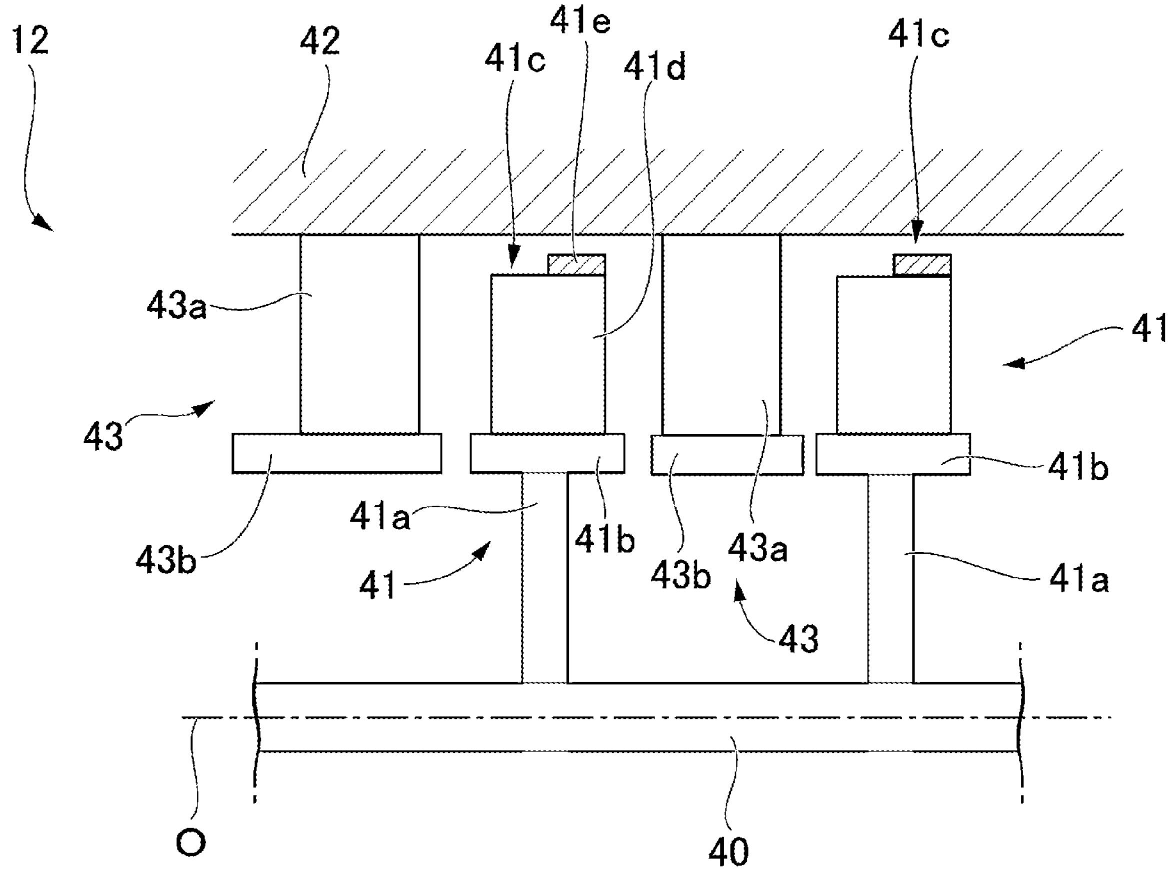
FIG. 2 is a cross-sectional view illustrating a configuration of a turbine according to the first embodiment of the present disclosure.

As illustrated in FIG. 2, the turbine 12 includes a shaft 40 extending along an axis O, two turbine blade rows 41 provided on the shaft 40 with an interval therebetween in a direction of the axis O, a cylindrical casing 42 that covers the shaft 40 and the turbine blade rows 41 from the outside in a radial direction, and two turbine vane rows 43 provided on an inner circumferential surface of the casing 42 and each provided on an upstream side (one side in the direction of the axis O: a side into which a fluid flows) of each of the turbine blade rows 41.

The shaft 40 is rotatable around the axis O. The turbine blade rows 41 are each formed integrally with the shaft 40. That is, the shaft 40 and turbine blade row 41 constitute a so-called blisk. The turbine blade rows 41 are exposed to a working fluid flowing from one side (upstream side) to the other side (downstream side) in the direction of the axis O. The turbine blade rows 41 each include a disc-shaped disc 41*a* protruding outward in the radial direction from an outer surface of the shaft 40, a platform 41*b* attached to an outer surface of the disc 41*a*, and a plurality of turbine blades 41*c* extending outward in the radial direction from the platform 41*b*, and a shroud 41*e*. The turbine blades 41*c* each have an airfoil cross-sectional shape when viewed from the radial direction. Also, the thickness of the disc 41*a* in the direction of the axis O is smaller than that of the turbine blade 41*c* and the platform 41*b*.

The turbine vane rows 43 each includes a plurality of turbine vanes 43*a* protruding inward in the radial direction from an inner circumferential surface of the casing 42, and turbine vane shrouds 43*b* provided at end portions of the turbine vanes 43*a* on an inner circumferential side. The turbine vane 43*a* has an airfoil cross-sectional shape when viewed from the radial direction. The turbine vane shroud 43*b* is a plate-shaped member attached to an end portion of the turbine vanes 43*a* on the inner circumferential side. A plurality of turbine vane shrouds 43*b* are continuous in a circumferential direction around the shaft 40 to form an annular shape with the axis O as a center. Such turbine vane rows 43 are each disposed on an upstream side of each of the turbine blade rows 41.

(Configuration of Turbine Blade)

Figure 3:
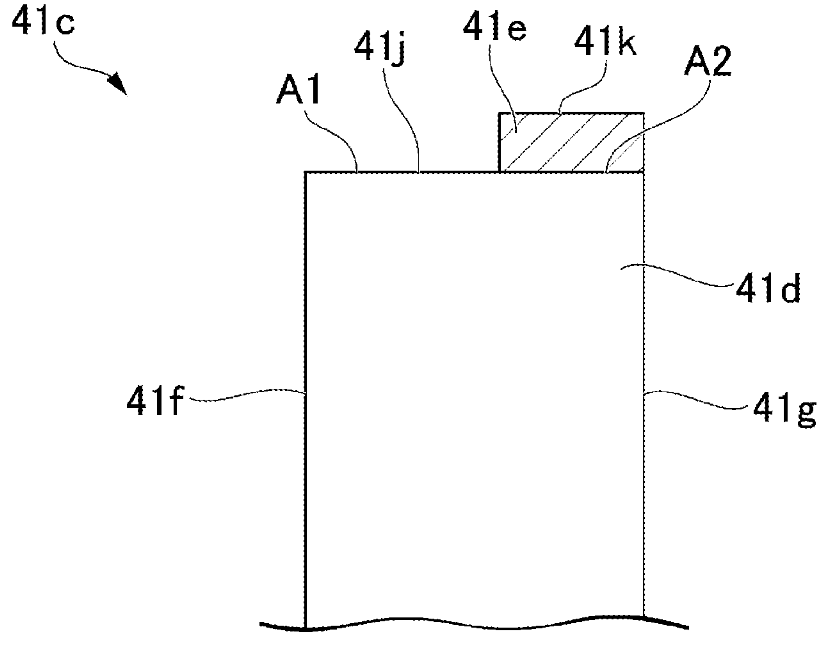
FIG. 3 is a cross-sectional view of a blade according to the first embodiment of the present disclosure from a circumferential direction.
Figure 4:
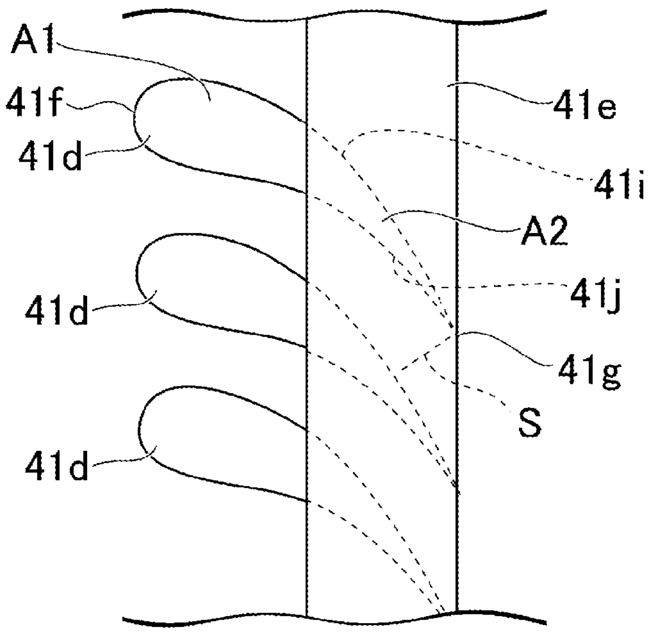
FIG. 4 is a view of the blade according to the first embodiment of the present disclosure from the outside in a radial direction.

As illustrated in FIG. 3 and FIG. 4, each of the turbine blades 41*c* includes a blade main body 41*d*. The plurality of blade main bodies 41*c* are disposed at intervals in the circumferential direction. Each of the blade main bodies 41*d* has an airfoil cross-sectional shape extending from a leading edge 41*f* to a trailing edge 41*g*. As illustrated in FIG. 3, a surface of the blade main body 41*d* facing outward in the radial direction is a tip end surface 41*j*. The tip end surface 41*j* extends along the axis O.

The shroud 41*e* covers a portion of the tip end surface 41*j* of the blade main body 41*d* from the outside in the radial direction. The shroud 41*e* may be formed integrally with the blade main body 41*d*, or may be formed separately. Further, if they are integrally formed, processing can be easily performed by reducing a dimension of the shroud 41*e* in the direction of the axis O to be small. The shroud 41*e* extends continuously in the circumferential direction to form an annular shape with the axis O as a center. As illustrated in FIG. 4, one region including the leading edge 41*f* of the tip end surface 41*j* is defined as a leading edge side region A1 and the other region including a trailing edge 41*g* thereof is defined as a trailing edge side region A2. The shroud 41*e* covers only the trailing edge side region A2, the leading edge side region A1 of the tip end surface 41*j* is exposed radially outward.

Further, the trailing edge side region A2 referred to herein is an area of each tip end surface 41*j* corresponding to 20-80% of the length of the blade main body 41*d* in the direction of the axis O with the trailing edge 41*g* as a reference. More desirably, the trailing edge side region A2 is an area of each tip end surface 41*j* corresponding to 30-70% of the blade length. Most desirably, the trailing edge side region A2 is an area of each tip end surface 41*j* corresponding to 40-60% of the blade length. Also, as illustrated in FIG. 4, the shroud 41*e* covers a position (throat S) at which the distance between adjacent blade main bodies 41*d* is the smallest. The throat S is positioned at an area between an end portion of a concave side surface 41*h* of the blade main body 41*d* on the trailing edge 41*g* side and a convex side surface 41*i* of the adjacent blade main body 41*d*.

As illustrated in FIG. 3, the shroud 41*e* has a rectangular cross-sectional shape when viewed from the circumferential direction. Thereby, a level difference is formed between the leading edge side region A1 of the tip end surface 41*j* and an outer surface 41*k* of the shroud 41*e*. In other words, the outer surface 41*k* is positioned on a radially outward side of the leading edge side region A1. Also, as illustrated in FIG. 4, in the present embodiment, both a surface of the shroud 41*e* facing the upstream side and a surface of the shroud 41*e* facing the downstream side extend in a flat shape. Further, the surface of the shroud 41*e* facing the downstream side is positioned on a straight line connecting the trailing edges 41*g* of the plurality of blade main bodies 41*d*.

(Operation and Effects)

Here, in a free-standing blade without the shroud 41*e*, the blade main body 41*d* is only supported from an inner circumferential side by the disc 41*a*, and thus vibration is likely to occur at a blade end. Therefore, providing an annular shroud on an outer circumferential side of the blades to connect between the blades is conceivable. In this case, the entire region from the leading edge side to the trailing edge side of the blade is generally covered with a shroud conventionally.

However, when the entire region from the leading edge 41*f* side to the trailing edge 41*g* side of the blade main body 41*d* is covered with the shroud as described above, the weight increases by an amount corresponding to the shroud. Thereby, there has been a problem that vibration is likely to occur. Therefore, in the present embodiment, a configuration in which only the trailing edge side region A2 is covered with the shroud 41*e* as described above is employed.

According to the above-described configuration, the weight of the shroud 41*e* itself can be reduced compared to, for example, a configuration in which the shroud 41*e* covers both the leading edge side region A1 and the trailing edge side region A2. As a result, since the shroud 41*e* itself is lightweight in addition to being able to reduce vibration of the blade end of the blade main body 41*d* by providing the shroud, increase in an exciting force due to the shroud 41*e* can be avoided compared to a case of the free-standing blade.

Figure 5:
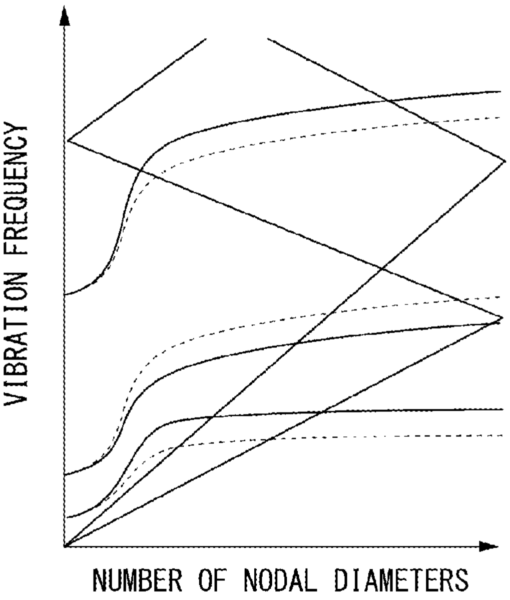
FIG. 5 is an interference diagram showing a relationship between the number of nodal diameters and a vibration frequency in the blade.

Also, it is possible to control a specific vibration mode by appropriately adjusting dimensions of a body of the shroud 41*e*. As shown in an interference diagram in FIG. 5 as an example, each vibration mode from a low order to a high order can be changed by adjusting the dimensions of a body of the shroud 41*e*. In FIG. 5, the solid-line curve indicates a vibration mode when the shroud 41*e* according to the present embodiment is applied, and the broken-line curve indicates a vibration mode when the shroud 41*e* is not attached. In addition, the region surrounded by the straight line indicates a range of an operating rotation speed. As shown in FIG. 5, since an interval between vibration modes in the range of the operating rotation speed is large, it can be ascertained that a rotation speed range in which operation is possible without causing resonance extends especially in a high-order region.

Here, since the trailing edge side region A2 of the blade main body 41*d* has a blade thickness smaller than that of the leading edge side region A1, vibration is particularly likely to occur. According to the above-described configuration, the trailing edge side region A2 in which vibration is likely to occur is covered with the shroud. Thereby, occurrence of vibration can be more actively reduced.

Further, according to the above-described configuration, since the trailing edge side region A2 including the throat S is covered with the shroud 41*e*, the working fluid flowing outward in the radial direction at the throat S can be prevented (sealing can be enhanced). Thereby, performance of the turbine blades 41*c* can be further improved.

Also, in the present embodiment, the shroud 41*e* covers an area of each tip end surface corresponding to 20-80% of the length of the blade main body 41*d* in the direction of the axis O. According to this configuration, vibration of the blade main body 41*d* can be reduced while reducing the weight increase due to provision of the shroud 41*e* to a minimum.

Figure 6:
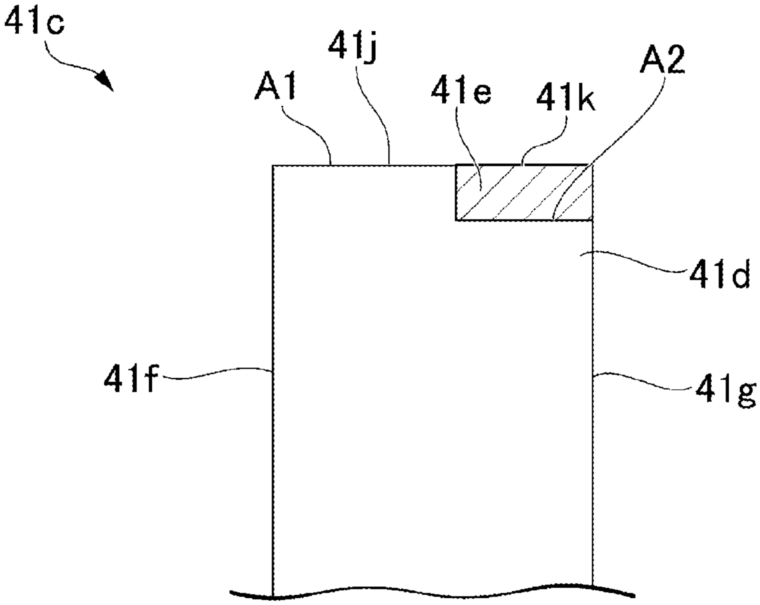
FIG. 6 is a cross-sectional view illustrating a modified example of the blade according to the first embodiment of the present disclosure.

The first embodiment of the present disclosure has been described above. Further, various changes and modifications can be made to the above-described configurations without departing from the gist of the present disclosure. For example, as a modified example, as illustrated in FIG. 6, the outer surface 41*k* of the shroud 41*e* can be flush with the tip end surfaces 41*j*. That is, in this case, the shroud 41*e* is in a state of being accommodated in a notch formed in the blade main body 41*d*. According to this configuration, since the tip end surfaces 41*j* of the blade main bodies 41*d* are flush with the outer surface 41*k* of the shroud 41*e*, no level difference is formed between the casing 42 and the turbine blade 41*c*. Thereby, a leakage flow generated between the casing 42 and the turbine blades 41*c* can be further reduced.

Second Embodiment

Figure 7:
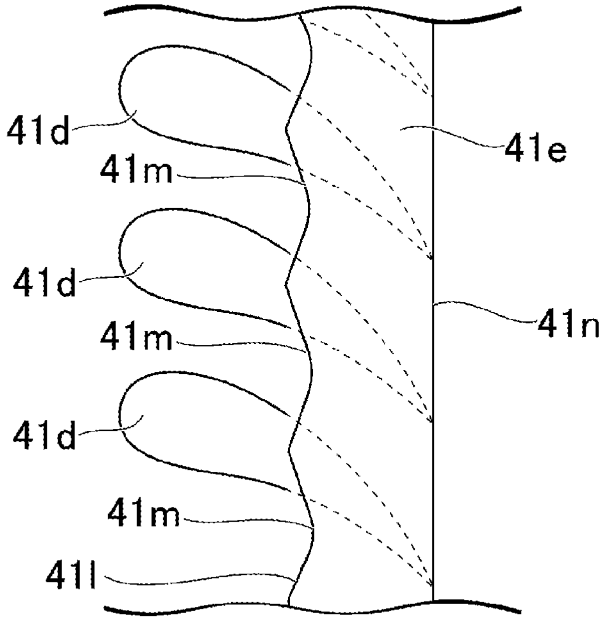
FIG. 7 is a view of a blade according to a second embodiment of the present disclosure from the outside in a radial direction.

Next, a second embodiment of the present disclosure will be described with reference to FIG. 7. Further, configurations the same as those in the above-described first embodiment will be denoted by the same reference signs, and a detailed description thereof will be omitted. As illustrated in FIG. 7, in the present embodiment, the shape of a shroud 41*e* differs from that in the first embodiment. In the shroud 41*e* according to the present embodiment, an upstream surface 41*l*, which is a forward end surface of the shroud 41*e* facing the upstream side, has a wave shape while a downstream surface 41*n*, which is a backward end surface of the shroud 41*e* facing the downstream side, is formed to be parallel with a virtual plane orthogonal to the axis O.

Specifically, a plurality of recessed portions 41*m* recessed toward the downstream side are formed on the upstream surface 41*l*. The recessed portions 41*m* are each formed at a portion between blade main bodies 41*d* adjacent to each other. That is, a first length in the direction of the axis O of a first portion of the shroud 41*e* positioned between the blade main bodies 41*d* is smaller than a second length in the direction of the axis O of a second portion of the shroud 41*e* with which the blade main body 41*d* is in contact.

According to the above-described configuration, since the first portion of the shroud positioned between the blade main bodies has a smaller axial length than the other portions, further weight reduction of the shroud can be achieved. Also, when the size of the recessed portion 41*m* is adjusted as appropriate, a specific vibration mode can be controlled. Thereby, the degree of freedom in designing turbine blades 41*c* can be further improved.

Figure 8:
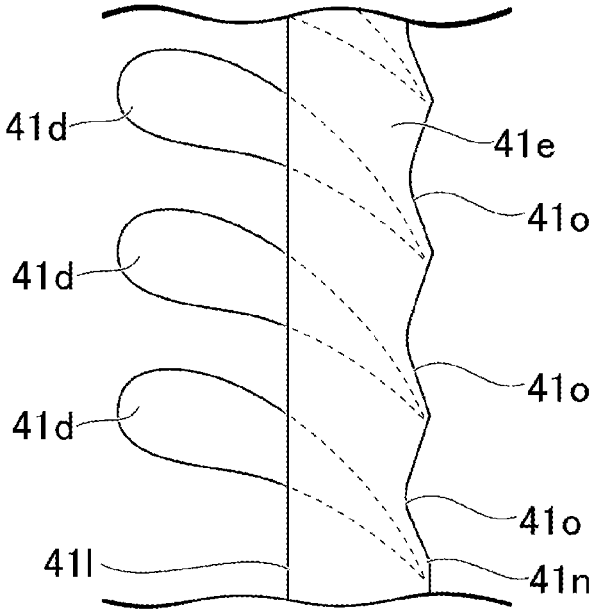
FIG. 8 is a view illustrating a first modified example of the blade according to the second embodiment of the present disclosure when the blade is viewed from the outside in the radial direction.
Figure 9:
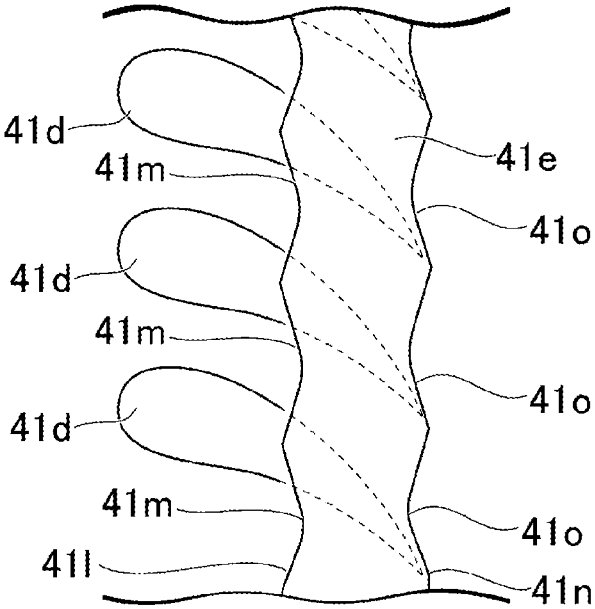
FIG. 9 is a view illustrating a second modified example of the blade according to the second embodiment of the present disclosure when the blade is viewed from the outside in the radial direction.

The second embodiment of the present disclosure has been described above. Further, various changes and modifications can be made to the above-described configurations without departing from the gist of the present disclosure. For example, as illustrated in FIG. 8 as a first modified example, a plurality of recessed portions 41o recessed toward the upstream side can be formed on the downstream surface 41_n_ instead of the upstream surface 41_l_. Also, as shown in FIG. 9 as a second modified example, it is possible to form the recessed portion 41_m_ on the upstream surface 41_l_ and also form the recessed portion 41o on the downstream surface 41_n_. Even with these configurations, weight reduction of the shroud 41_e_ can be achieved. Also, the degree of freedom in designing vibration mode control can be further improved.

Further, the shroud 41_e_ according to the present embodiment also can be configured so that a tip end surfaces 41_j_ may be flush with an outer surface of the shroud 41_e_ as described in the modified example of the first embodiment.

Third Embodiment

Figure 10:
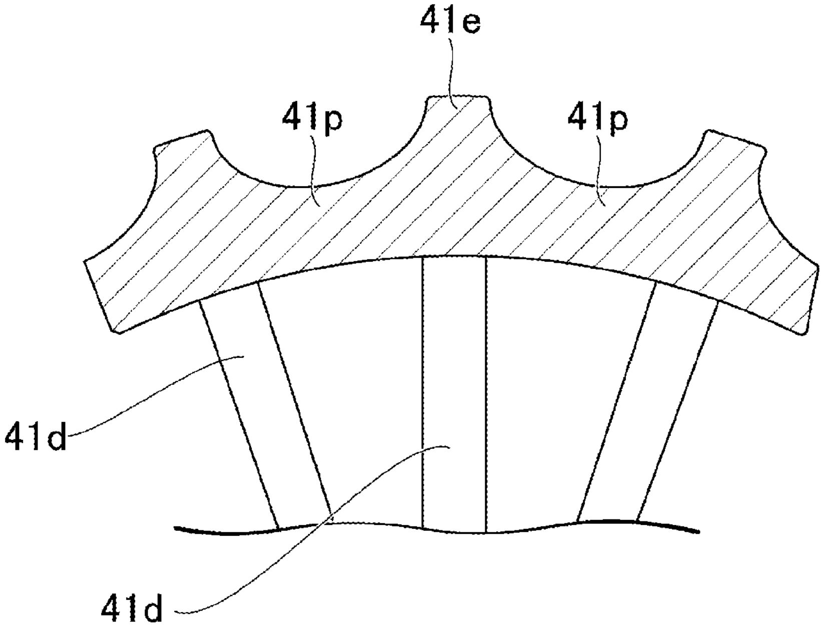
FIG. 10 is a cross-sectional view of a blade according to a third embodiment of the present disclosure from an axial direction.
Figure 11:
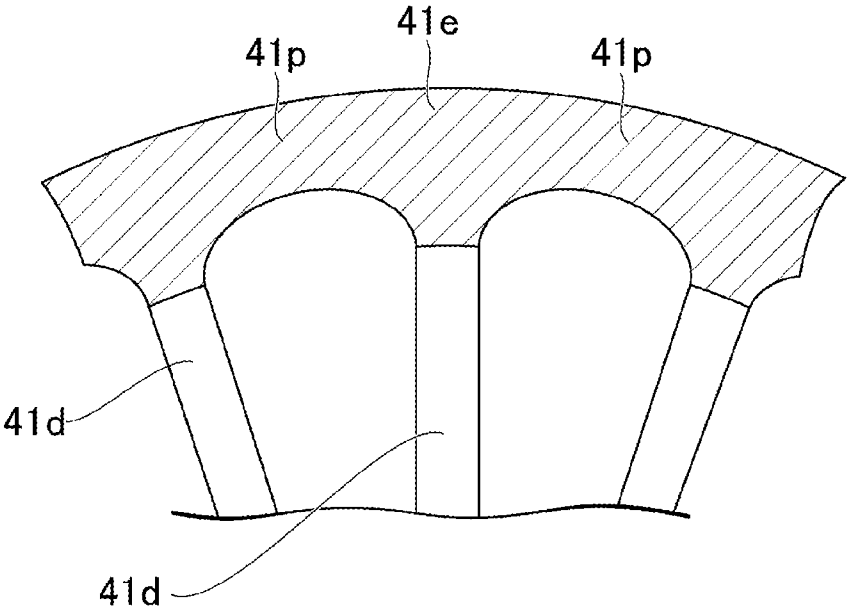
FIG. 11 is a view of a first modified example of the blade according to the third embodiment of the present disclosure from an axial direction.

Next, a third embodiment of the present disclosure will be described with reference to FIG. 10. Further, configurations the same as those in the above-described embodiments will be denoted by the same reference signs, and detailed description thereof will be omitted. As illustrated in FIG. 10, in the present embodiment, the thickness (width in radial direction) of a shroud 41_e_ of one portion of the shroud 41_e_ with which the blade main body 41_d_ is in contact differs from another portion of the shroud 41_e_ positioned between the blade main bodies 41_d_. Specifically, the thickness of the portion 41_p_ of the shroud 41_e_ positioned between the blade main bodies 41_d_ is smaller than that of the portion of the shroud 41_e_ with which the blade main body 41_d_ is in contact. Also, it is desirable that the thickness of the shroud 41_e_ gradually decrease with distance away from the portion at which the blade main body 41_d_ is positioned (that is, as the portion 41_p_ is approached). Further, in the example of FIG. 10, the thickness is changed by forming recessed portions on an outer surface of the shroud 41_e_, but similar recessed portions may also be formed on an inner circumferential surface thereof as illustrated in FIG. 11. Also, recessed portions may be formed on both the outer surface and the inner circumferential surface.

According to the above-described configuration, further weight reduction of the shroud 41_e_ can be achieved. Also, it is possible to more finely control a specific vibration mode by appropriately adjusting dimensions of a body of the shroud 41_e_.

Figure 12:
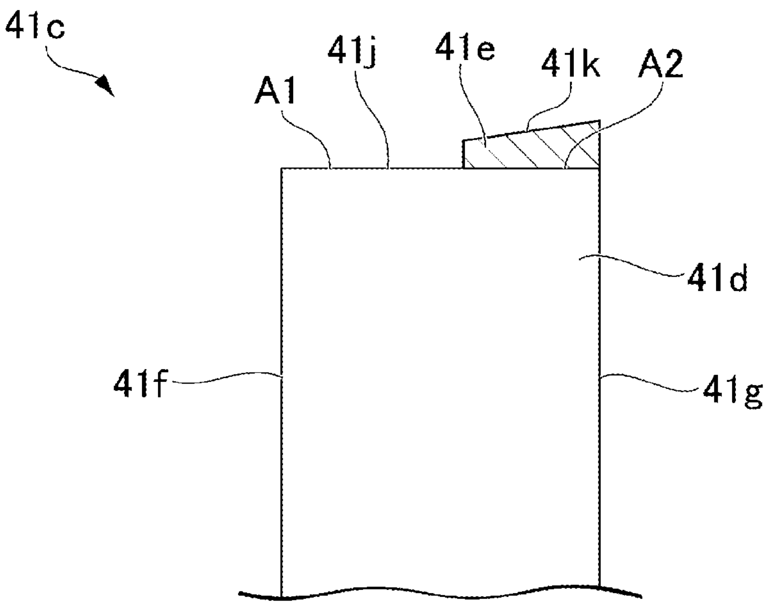
FIG. 12 is a cross-sectional view illustrating a second modified example of the blade according to the third embodiment of the present disclosure.
Figure 13:
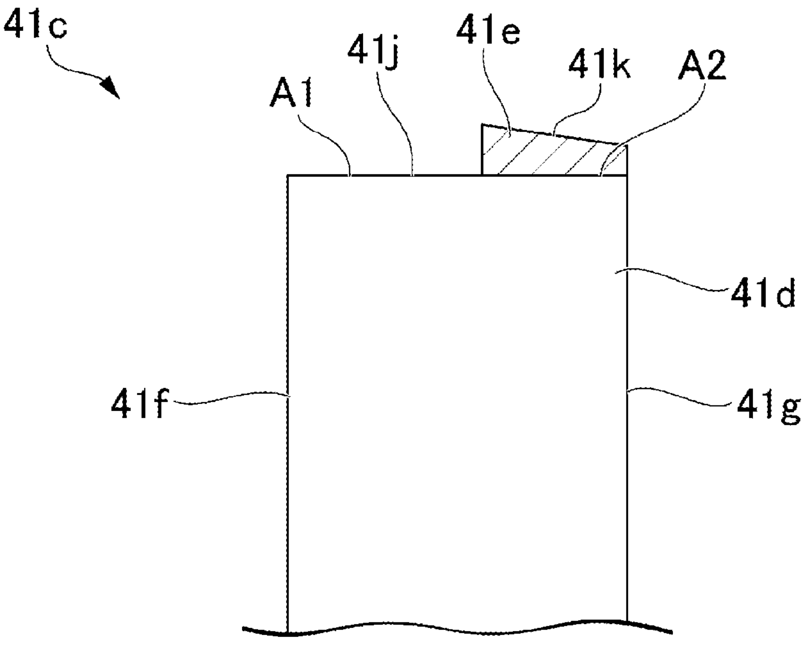
FIG. 13 is a cross-sectional view illustrating a third modified example of the blade according to the third embodiment of the present disclosure.

The third embodiment of the present disclosure has been described above. Further, various changes and modifications can be made to the above-described configurations without departing from the gist of the present disclosure. For example, the configuration according to the second embodiment described above and the configuration according to the third embodiment can be combined and applied. Also, as illustrated in FIG. 12 as a second modified example, the thickness of the shroud 41_e_ may also be configured to be gradually decreased towards the forward end surface of the shroud 41_e_ facing the upstream side. In this case, the thickness on the upstream side (leading edge side) may be configured to be reduced throughout in the circumferential direction, or the thickness on the upstream side (leading edge side) may be configured to be reduced only in the portion between the blade main bodies 41_d_ as in the above-described third embodiment. As illustrated in FIG. 13 as a third modified example, the thickness of the shroud 41_e_ may also be configured to be gradually decreased towards the backward end surface of the shroud 41_e_ facing the downstream side. Also, the thicknesses of the upstream side and the downstream side may be configured to be smaller than a thickness of a central portion. With any of the configurations, it is possible to achieve both weight reduction of the shroud 41_e_ and precise control of the vibration mode.

Fourth Embodiment

Figure 14:
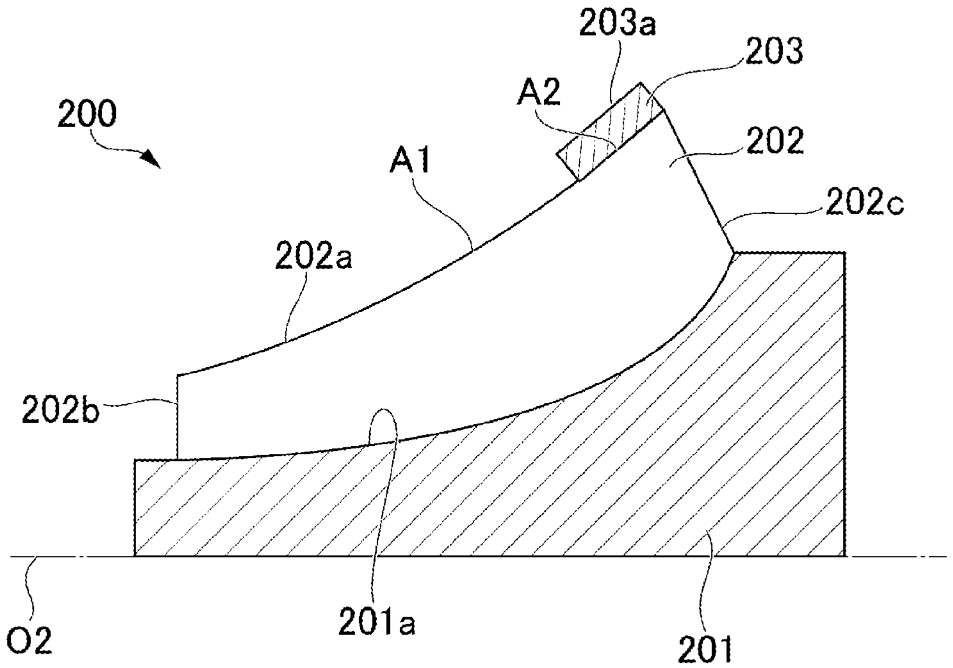
FIG. 14 is a cross-sectional view illustrating a configuration of an impeller according to a fourth embodiment of the present disclosure.

Next, a fourth embodiment of the present disclosure will be described with reference to FIG. 14. As illustrated in FIG. 14, in the present embodiment, a shroud 203 is applied to an impeller 200 applied to a compressor or a pump.

The impeller 200 includes a columnar disc 201 centered on an axis O2, a plurality of blades 202 extending from an outer surface (main surface 201_a_) of the disc 201 toward an outer circumferential side, and the shroud 203 covering outer surfaces of the plurality of blades 202 from the outside. The main surface 201_a_ of the disc 201 is curved outward in a radial direction from one side (that is, an upstream side of a fluid) toward the other side (that is, a downstream side of the fluid) in a direction of the axis O2. The blades 202 are disposed on the main surface 201_a_ at intervals in a circumferential direction. The blades 202 each have a leading edge 202_b_ facing the upstream side and a trailing edge 202_c_ facing the downstream side. Also, although not illustrated in detail, each blade 202 is twisted from one side toward the other side in the circumferential direction from the leading edge 202_b_ side toward the trailing edge 202_c_ side.

On a surface facing an outer circumferential side of the blade 202 (blade outer surface 202_a_), a portion on the leading edge 202_b_ side is defined as a leading edge side region A1, and a portion on the trailing edge 202_c_ side is defined as a trailing edge side region A2. Further, as in the first embodiment, the trailing edge side region A2 referred to herein is an area of each tip end surface corresponding to 20% to 80% of the length of the blade 202 in the direction of the axis O2 with the trailing edge 202_c_ as a reference. Desirably, the trailing edge side region A2 is an area corresponding to 30% to 70% of the length of the blade 202. Most desirably, the trailing edge side region A2 is an area corresponding to 40% to 60% of the length of the blade 202.

The shroud 203 covers only a portion (trailing edge side region A2) of the blade outer surface 202_a_ including an end edge on the trailing edge 202_c_ side from the outer circumferential side. That is, the leading edge side region A1 of the blade outer surface 202_a_ is exposed to a radially outward side. Also, in the present embodiment, a level difference is formed between the leading edge side region A1 and an outer surface 203_a_ of the shroud 203.

According to the above-described configuration, vibration generated in the blade 202 can be reduced by the shroud 203. Also, weight increase can be suppressed compared to a case in which the shroud 203 is provided throughout whole area of the tip end surface of the blade 202 in the direction of the axis O2. Thereby, a compressor and a pump including the impeller 200 can be more stably operated.

Figure 15:
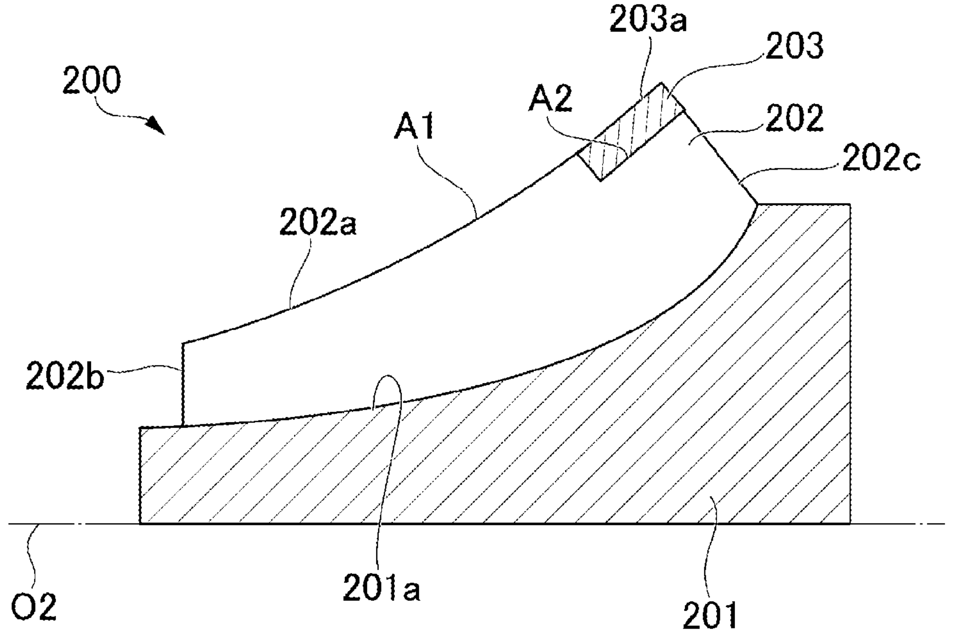
FIG. 15 is a cross-sectional view illustrating a modified example of the impeller according to the fourth embodiment of the present disclosure.

The fourth embodiment of the present disclosure has been described above. Further, various changes and modifications can be made to the above-described configurations without departing from the gist of the present disclosure. For example, as illustrated in FIG. 15 as a modified example, the outer surface 203_a_ of the shroud 203 may be flush with the blade outer surface 202_a_ in the leading edge side region A1.

Also, the configurations according to the second embodiment, the third embodiment, and their modified examples described above can be combined with the shroud 203 according to the present embodiment and applied.

Figure 16:
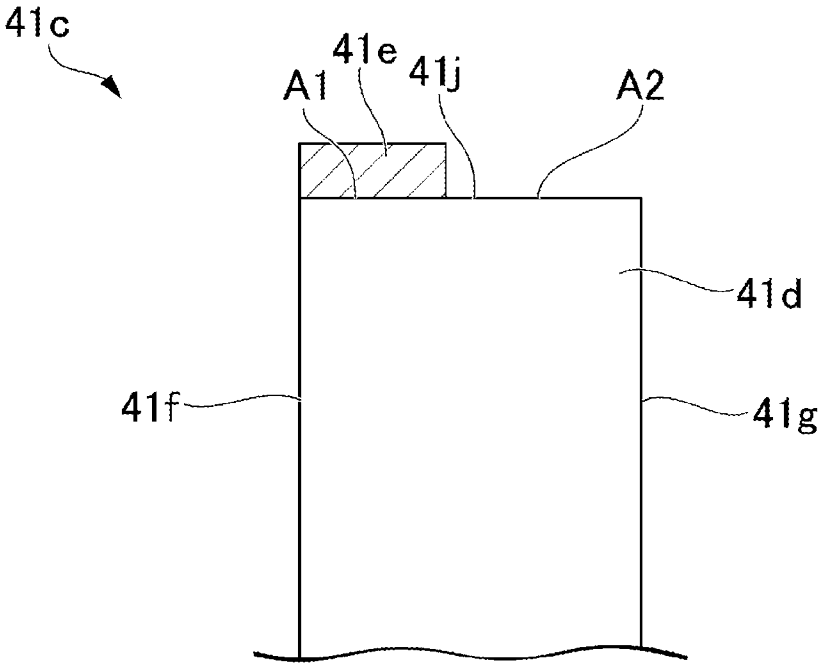
FIG. 16 is a cross-sectional view of a blade according to a fifth embodiment of the present disclosure from a circumferential direction.

Further, a configuration illustrated in FIG. 16 can be employed as a modification common to the embodiments. In the embodiments described above, an example in which the shroud 41*e* (or the shroud 203) covers the trailing edge side region A2 has been described. However, a configuration in which the shroud 41*e* covers the leading edge side region A1 can also be employed as illustrated in FIG. 16. That is, the shroud 41*e* may cover either one of the leading edge side region A1 and the trailing edge side region A2.

<Additional Statement>

The blade set (the turbine blades 41*c*, the blades 202) and the blisk described in the embodiments are grasped, for example, as follows.

(1) A blade set according to a first aspect is a blade exposed to a working fluid, which includes blade main bodies 41*d* which are disposed at intervals in a circumferential direction about an axis O and each extending in a radial direction with respect to the axis O wherein a tip end surface 41*j* is formed on an outer circumferential side of each the blade main body 41*d* and the tip end surface of the blade main body 41*d* includes a leading edge side region A1 positioned on an upstream side in a flow direction of the working fluid along the axis O and a trailing edge side region A2 positioned on a downstream side in the flow direction, and a shroud 41*e* which is provided on an outer circumferential side of the blade main bodies 41*d* and covering either the leading edge side regions A1 or the trailing edge side regions A2 of the blade main bodies 41*d*.

According to the above-described configuration, the shroud 41*e* covers only one of the leading edge side region A1 and the trailing edge side region A2. Thereby, the weight of the shroud 41*e* itself can be reduced compared to, for example, a configuration in which the shroud 41*e* covers both the leading edge side region A1 and the trailing edge side region A2. As a result, since the shroud 41*e* itself is lightweight in addition to being able to reduce vibration of the blade main body 41*d* by providing the shroud 41*e*, increase in an exciting force due to the shroud 41*e* can also be avoided compared to a case of a free-standing blade. Also, it is possible to control a specific vibration mode by appropriately adjusting dimensions of a body of the shroud 41*e*.

(2) In the blade set according to a second aspect, it may be such that the trailing edge side regions A2 of the blade main bodies 41*d* are covered by the shroud 41*e* and the leading edge side regions A1 are exposed radially outward to the blade main bodies 41*d*.

Here, since the trailing edge side region A2 of the blade main body 41*d* has a blade thickness smaller than that of the leading edge side region A1, vibration is particularly likely to occur. According to the above-described configuration, the trailing edge side region A2 in which vibration is likely to occur is covered with the shroud 41*e*. Thereby, occurrence of vibration can be more actively reduced.

(3) In the blade set according to a third aspect, it may be such that the leading edge side regions A1 or the trailing edge side regions A2 are flush with an outer surface of the shroud 41*e*.

According to the above-described configuration, since a tip end surfaces 41*j* of the blade main bodies 41*d* are flush with the outer surface of the shroud 41*e*, no level difference is formed between a casing and the blade. Thereby, the leakage flow generated between the casing and the blade can be reduced.

(4) In the blade set according to a fourth aspect, it may be such that the trailing edge side region A2 of the blade main body 41*d* includes a throat S in which the distance between the blade main bodies 41*d* adjacent to each other is the smallest.

According to the above-described configuration, since the trailing edge side region A2 including the throat S is covered with the shroud 41*e*, the working fluid flowing outward in the radial direction at the throat position S can be prevented (sealing can be enhanced). Thereby, performance of the blades can be further improved.

(5) In the blade set according to a fifth aspect, it may be such that the shroud 41*e* covers an area of each tip end surface 41*j* corresponding to 20-80% of the length of the blade main body 41*d* in the direction of the axis O.

According to this configuration, vibration of the blade main body 41*d* can be reduced while reducing the weight increase due to provision of the shroud 41*e* to a minimum. Also, it is possible to control a specific vibration mode by appropriately adjusting dimensions of a body of the shroud 41*e*.

(6) In the blade set according to a sixth aspect, it may be such that a first length in the direction of the axis O of a first portion of the shroud 41*e* positioned between the blade main bodies 41*d* is smaller than a second length in the direction of the axis O of a second portion of the shroud 41*e* with which the blade main body 41*d* is in contact.

According to the above-described configuration, since the portion of the shroud 41*e* positioned between the blade main bodies 41*d* has a smaller length in the direction of the axis O than the other portions, further weight reduction of the shroud 41*e* can be achieved.

(7) In the blade set according to a seventh aspect, it may be such that a forward end surface of the shroud 41*e* facing the upstream side in the flow direction is recessed toward the downstream side at the second portion of the shroud 41*e* positioned between the blade main bodies 41*d*.

According to the above-described configuration, further weight reduction of the shroud 41*e* can be achieved. Also, it is possible to control a specific vibration mode by appropriately adjusting dimensions of a body of the shroud 41*e*.

(8) In the blade set according to an eighth aspect, it may be such that a backward end surface of the shroud 41*e* facing the downstream side in the flow direction is recessed toward the upstream side at the second portion of the shroud 41*e* positioned between the blade main bodies 41*d*.

According to the above-described configuration, further weight reduction of the shroud 41*e* can be achieved. Also, it is possible to control a specific vibration mode by appropriately adjusting dimensions of a body of the shroud 41*e*.

(9) In the blade set according to a ninth aspect, it may be such that the radial thickness of the first portion of the shroud 41*e* positioned between the blade main bodies 41*d* is smaller than that of the second portion of the shroud 41*e* with which the blade main body 41*d* is in contact.

According to the above-described configuration, further weight reduction of the shroud 41*e* can be achieved. Also, it is possible to control a specific vibration mode by appropriately adjusting dimensions of a body of the shroud 41*e*.

(10) In the blade set according to a tenth aspect, it may be such that the radial thickness thereof is gradually decrease towards a forward end surface of the shroud 41*e* facing the upstream side in the flow direction from a backward end surface of the shroud 41*e* facing the downstream side.

According to the above-described configuration, further weight reduction of the shroud 41*e* can be achieved. Also, it is possible to control a specific vibration mode by appropriately adjusting dimensions of a body of the shroud 41*e*.

(11) In the blade set according to an eleventh aspect, it may be such that the radial thickness thereof is gradually decreased towards a backward end surface of the shroud 41*e* facing the downstream side in the flow direction from a forward end surface of the shroud 41*e* facing the upstream side.

According to the above-described configuration, further weight reduction of the shroud 41*e* can be achieved. Also, it is possible to control a specific vibration mode by appropriately adjusting dimensions of a body of the shroud 41*e*.

(12) A blisk (turbine blade row 41) according to a twelfth aspect includes the blade set according to any one of the above-described aspects, and a disc 41*a* having a disc shape centered around the axis O and which is integrally provided on an inner circumferential side of the blade main bodies 41*d*.

According to the above disclosure, it is possible to obtain a blisk in which vibration is reduced and the weight is reduced.

EXPLANATION OF REFERENCES

100 Rocket engine
1 Liquid hydrogen turbopump
2 Liquid oxygen turbopump
3 Engine main body
4 Fuel line
5 Oxidizer line
6 Cooling line
7 Recovery line
8 Fuel valve
9 Oxidizer valve
10 Coolant valve
11, 21 Pump main body
12, 22 Turbine
31 Combustion chamber
32 Nozzle
40 Shaft
41 Turbine blade row
41*a* Disc
41*b* Platform
41*c* Turbine blade
41*d* Blade main body
41*e* Shroud
41*f* Leading edge
41*g* Trailing edge
41*h* Concave side surface
41*i* Convex side surface
41*j* Tip end surface
41*k* Outer surface
411 Upstream surface
41*m* Recessed portion
41*n* Downstream surface
41*o* Recessed portion
41*p* Portion
200 Impeller
201 Disc
201*a* Main surface
202 Blade
202*a* Blade outer surface
202*b* Leading edge
202*c* Trailing edge
203 Shroud
203*a* Outer surface
A1 Leading edge side region
A2 Trailing edge side region
O, O2 Axis
S Throat position

What is claimed is:

1. A blade set that is exposed to a working fluid, comprising:

blade main bodies disposed at intervals in a circumferential direction about an axis and each extending in a radial direction with respect to the axis, wherein each of the blade main bodies includes, on an outer circumferential side thereof, a tip end surface having a leading edge side region positioned on an upstream side in a flow direction of the working fluid along the axis and a trailing edge side region positioned on a downstream side in the flow direction; and a shroud disposed on the outer circumferential side of the blade main bodies and covering the trailing edge side region of each of the blade main bodies, wherein the leading edge side region of each of the blade main bodies is uncovered and exposed.

2. The blade set according to claim 1, wherein the trailing edge side region of each of the blade main bodies is flush with an outer surface of the shroud.

3. The blade set according to claim 1, wherein the trailing edge side region of each of the blade main bodies includes a throat in which a distance between the blade main bodies adjacent to each other is the smallest.

4. The blade set according to claim 1, wherein the shroud covers an area of the tip end surface of each of the blade main bodies corresponding to 20-80% of a length of the respective one of the blade main bodies in a direction of the axis.

5. The blade set according to claim 1, wherein a first length in a direction of the axis of a first portion of the shroud positioned between the blade main bodies is smaller than a second length in the direction of the axis of a second portion of the shroud with which the blade main bodies are in contact.

6. The blade set according to claim 5, wherein a forward end surface of the shroud facing the upstream side in the flow direction is recessed toward the downstream side at the first portion of the shroud positioned between the blade main bodies.

7. The blade set according to claim 5, wherein a backward end surface of the shroud facing the downstream side in the flow direction is recessed toward the upstream side at the first portion of the shroud positioned between the blade main bodies.

8. The blade set according to claim 1, wherein a radial thickness of a first portion of the shroud positioned between the blade main bodies is smaller than that of a second portion of the shroud with which the blade main bodies are in contact.

9. The blade set according to claim 1, wherein a radial thickness of the shroud gradually decreases towards a forward end surface of the shroud facing the upstream side in the flow direction from a backward end surface of the shroud facing the downstream side.

10. The blade set according to claim 1, wherein a radial thickness of the shroud gradually decreases towards a backward end surface of the shroud facing the downstream side in the flow direction from a forward end surface of the shroud facing the upstream side.

11. A blisk comprising:

the blade set according to claim 1; and a disc having a disc shape centered around the axis and that is integrally provided on an inner circumferential side of the blade main bodies.

* * * * *